United States Patent
Takeshita et al.

(10) Patent No.: US 12,030,019 B2
(45) Date of Patent: Jul. 9, 2024

(54) HOLLOW FIBER MEMBRANE MODULE AND METHOD FOR CLEANING THE SAME

(71) Applicant: Kuraray Co., Ltd., Kurashiki (JP)

(72) Inventors: Toshimitsu Takeshita, Okayama (JP); Koji Miyake, Okayama (JP); Naru Teshima, Okayama (JP)

(73) Assignee: Kuraray Co., Ltd., Kurashiki (JP)

( * ) Notice: Subject to any disclaimer, the term of this patent is extended or adjusted under 35 U.S.C. 154(b) by 650 days.

(21) Appl. No.: 17/056,530

(22) PCT Filed: Jun. 20, 2019

(86) PCT No.: PCT/JP2019/024434
§ 371 (c)(1),
(2) Date: Nov. 18, 2020

(87) PCT Pub. No.: WO2020/004208
PCT Pub. Date: Jan. 2, 2020

(65) Prior Publication Data
US 2021/0236994 A1    Aug. 5, 2021

(30) Foreign Application Priority Data

Jun. 27, 2018    (JP) .................................. 2018-122056

(51) Int. Cl.
*B01D 65/02*    (2006.01)
*B01D 63/02*    (2006.01)
(Continued)

(52) U.S. Cl.
CPC ............. *B01D 65/02* (2013.01); *B01D 63/02* (2013.01); *B01D 63/043* (2013.01); *B01D 71/34* (2013.01);
(Continued)

(58) Field of Classification Search
CPC ...... B01D 65/02; B01D 63/043; B01D 71/34; B01D 2313/26; B01D 2321/04; B01D 2321/185; B01D 63/02
See application file for complete search history.

(56) References Cited

U.S. PATENT DOCUMENTS

2018/0333681 A1    11/2018    Nakanishi et al.

FOREIGN PATENT DOCUMENTS

| CN | 101480581 A | 7/2009 |
|----|-------------|--------|
| CN | 201399324 Y | 2/2010 |

(Continued)

OTHER PUBLICATIONS

Takata, WO2009145077 A1, English machine translation (Year: 2009).*

(Continued)

*Primary Examiner* — Bobby Ramdhanie
*Assistant Examiner* — Alexandria M Brady
(74) *Attorney, Agent, or Firm* — Oblon, McClelland, Maier & Neustadt, L.L.P.

(57) ABSTRACT

A hollow fiber membrane module includes: a hollow fiber membrane bundle; a housing formed with a port for allowing a cleaning gas for the hollow fiber membrane bundle to inflow therethrough for accommodating the hollow fiber membrane bundle; and a diffuser having a receiving surface for receiving the cleaning gas having entered through the port, the receiving surface being formed with diffusion hole for diffusing the cleaning gas to the hollow fiber membrane bundle in housing. The diffuser includes a partition dividing a space under the receiving surface into an inner space and an outer space surrounding the inner space and permitting the cleaning gas having entered through the port to flow thereinto. The diffusion hole is arranged to allow at least a (Continued)

part of the cleaning gas flowing in the outer space to diffuse from the inner space to the hollow fiber membrane bundle.

7 Claims, 11 Drawing Sheets

(51) Int. Cl.
  *B01D 63/04* (2006.01)
  *B01D 69/08* (2006.01)
  *B01D 71/34* (2006.01)

(52) U.S. Cl.
  CPC ...... *B01D 2313/26* (2013.01); *B01D 2321/04* (2013.01); *B01D 2321/185* (2013.01)

(56) References Cited

FOREIGN PATENT DOCUMENTS

| JP | 9-38470 A | 2/1997 | | |
|---|---|---|---|---|
| JP | 11-33367 A | 2/1999 | | |
| JP | 2016-87567 A | 5/2016 | | |
| JP | 2017-217580 A | 12/2017 | | |
| JP | 2018-51429 A | 4/2018 | | |
| WO | WO-2009145077 A1 * | 12/2009 | ............ | B01D 63/02 |
| WO | WO 2017/086313 A1 | 5/2017 | | |

OTHER PUBLICATIONS

Nakanishi, WO2017086313 A1, English machine translation (Year: 2017).*
Murase, JPH0938470 A, English machine translation (Year: 1997).*
Extended European Search Report issued Jul. 13, 2021 in European Patent Application No. 19826911.0, 10 pages.
International Search Report issued on Sep. 3, 2019 in PCT/JP2019/024434 filed on Jun. 20, 2019, 2 pages.
Combined Chinese Office Action and Search Report issued Dec. 15, 2021 in corresponding Chinese Patent Application No. 201980030873.8 (with Partial English Translation and English Translation of Category of Cited Documents) 10 pages.

* cited by examiner

HOLLOW FIBER MEMBRANE MODULE AND METHOD FOR CLEANING THE SAME

TECHNICAL FIELD

The present invention relates to a hollow fiber membrane module and a method for cleaning the same.

BACKGROUND ART

As disclosed in Patent Literature 1, hollow fiber membrane modules have been conventionally used in a filtration of removing impurities contained in water. Such a hollow fiber membrane module can obtain filtrated water after removing impurities from raw water (to be filtrated) having been supplied in a housing by causing the raw water to permeate hollow fiber membranes. Execution of the filtration by way of the hollow fiber membranes for a predetermined period of time causes an increase in an amount of deposition of suspended solids (SS) contained in the raw water onto membrane surfaces. This leads to a decline in filtration performance of the hollow fiber membranes. Accordingly, it is necessary to regularly clean the membrane surfaces.

Patent Literature 1 discloses a hollow fiber membrane module including a hollow fiber membrane bundle, a housing for accommodating the hollow fiber membrane bundle, a diffuser lying under the hollow fiber membrane bundle in the housing. The diffuser includes a disc-shaped main body and a cylindrical gas receiver provided on a bottom surface of the main body at the center thereof. The hollow fiber membrane module can temporarily store a cleaning gas having entered the housing in the receiver, effuse the stored cleaning gas radially outward, and thereafter diffuse the cleaning gas to the hollow fiber membrane bundle through diffusion holes. It is therefore possible to clean the surfaces of the hollow fiber membranes with the gas.

In the hollow fiber membrane module disclosed in Patent Literature 1, the housing has a lower part formed with an inflow port for the cleaning gas. However, the inflow port may be formed in a peripheral part of a housing in accordance with a specification of a module. In this case, the cleaning gas enters the housing from an outer periphery of a diffuser. If adopting this structure, the diffuser in Patent Literature 1 would diffuse the cleaning gas through the diffusion holes before the cleaning gas flows thoroughly in the circumferential direction. This consequently makes it difficult to clean the hollow fiber membrane bundle uniformly in the circumferential direction with the gas. In other words, the location of the inflow port for the cleaning gas is restricted to the lower part of the housing in the conventional hollow fiber membrane module to clean the hollow fiber membrane bundle uniformly in the circumferential direction.

CITATION LIST

Patent Literature

Patent Literature 1: Japanese Unexamined Patent Publication No. 2016-87567

SUMMARY OF INVENTION

An object of the present invention is to provide a hollow fiber membrane module and a method for cleaning the same, the module and the method achieving uniform cleaning of a hollow fiber membrane bundle in a circumferential direction with a cleaning gas even having entered from a peripheral part of a diffuser.

A hollow fiber membrane module according to one aspect of the present invention is a hollow fiber membrane module for an external pressure filtration, including: a hollow fiber membrane bundle including bundled hollow fiber membranes; a housing formed with a port for allowing a cleaning gas for cleaning the hollow fiber membrane bundle to inflow therethrough for accommodating the hollow fiber membrane bundle; and a diffuser having a receiving surface for receiving the cleaning gas having entered through the port, the receiving surface being formed with diffusion hole for diffusing the cleaning gas to the hollow fiber membrane bundle in the housing. The diffuser includes a partition dividing a space under the receiving surface into an inner space and an outer space surrounding the inner space and permitting the cleaning gas having entered through the port to flow thereinto. The diffusion hole is arranged to allow at least a part of the cleaning gas flowing in the outer space to diffuse from the inner space to the hollow fiber membrane bundle.

A method for cleaning a hollow fiber membrane module according to another aspect of the present invention includes a method for cleaning a hollow fiber membrane module for an external pressure filtration by cleaning a hollow fiber membrane bundle of the hollow fiber membrane module. The hollow fiber membrane module includes: a housing formed with a port for allowing a cleaning gas to inflow therethrough; the hollow fiber membrane bundle accommodated in the housing; and a diffuser having a receiving surface formed with diffusion hole for diffusing the cleaning gas to the hollow fiber membrane bundle in the housing, and defining an inner space and an outer space surrounding the inner space under the receiving surface. The method includes: flowing the cleaning gas into the outer space under the receiving surface of the diffuser through the port; flowing at least a part of the cleaning gas flowing in the outer space into the inner space; and diffusing the cleaning gas to the hollow fiber membrane bundle through the diffusion hole.

According to the present invention, it is possible to provide a hollow fiber membrane module and a method for cleaning the same, the module and the method achieving uniform cleaning of a hollow fiber membrane bundle in a circumferential direction with a cleaning gas even having entered from a peripheral part of a diffuser.

DESCRIPTION OF EMBODIMENTS

Hereinafter, a hollow fiber membrane module and a method for cleaning the same according to embodiments of the present invention will be described in detail with reference to the accompanying drawings.

First Embodiment

<Hollow Fiber Membrane Module>

Figure 1:
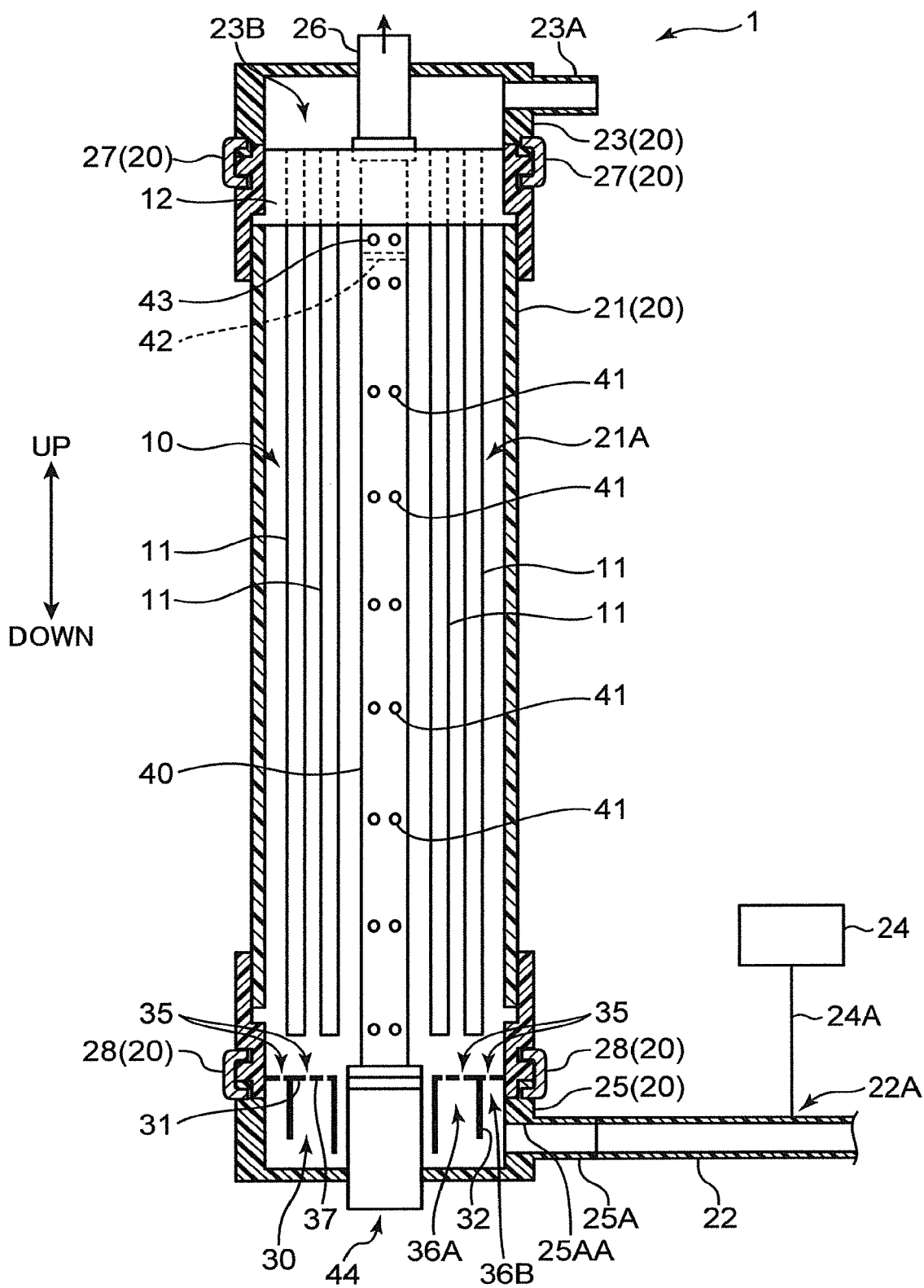
FIG. 1 schematically shows a configuration of a hollow fiber membrane module according to a first embodiment of the present invention.

First, an overall configuration of a hollow fiber membrane module 1 according to a first embodiment of the present invention will be described with reference to FIG. 1. The hollow fiber membrane module 1 is a module for an external pressure filtration, and mainly includes a hollow fiber membrane bundle 10 including bundled hollow fiber membranes 11, a housing 20, a diffuser 30, and a water flow pipe 40 as shown in FIG. 1. The term "external pressure filtration" represents a filtration way of obtaining filtrated water from a space defined by inner surfaces of the hollow fiber membranes 11 by causing raw water to permeate the hollow fiber membranes 11 from the outer surfaces to the inner surfaces thereof through membrane walls. Elements of the hollow fiber membrane module 1 will be described below.

The hollow fiber membrane bundle 10 includes a plurality of hollow fiber membranes 11 each of which vertically extends, and a retainer 12 which bind the plurality of hollow fiber membranes 11 together. As shown in FIG. 1, the hollow fiber membrane bundle 10 has a one-free-end structure in which the hollow fiber membranes 11 have upper ends each retained by the retainer 12, and lower ends which are free without being retained. The lower end of each of the hollow fiber membranes 11 may be sealed with, for example, a resin, but the structure should not be particularly limited thereto. Besides, as shown in FIG. 1, an outer peripheral surface of the retainer 12 is in close contact with the inner surface of the housing 20.

Various materials may be adopted for the hollow fiber membranes 11. For instance, hydrophilized poly vinylidene difluoride (PVDF) is adoptable. Furthermore, an epoxy adhesive resin is, for example, adoptable for the retainer 12, but the material should not be limited thereto.

The housing 20 includes a hollow cylindrical container for accommodating the hollow fiber membrane bundle 10, and is disposed in a vertically standing posture as shown in FIG. 1. The housing 20 has a housing main body 21, an upper cap 23, a lower cap 25, an upper coupling 27, and a lower coupling 28.

Each of the housing main body 21, the upper cap 23, and the lower cap 25 is made of, for example, resin such as poly vinyl chloride (PVC). Each of the upper coupling 27 and the lower coupling 28 includes a ring-shaped fastener for fastening the upper cap 23 and the lower cap 25 to the housing main body 21.

The housing main body 21 is a vertically extending hollow cylindrical member, and accommodates the hollow fiber membrane bundle 10. The housing main body 21 opens at an upper end and a lower end thereof, but the opening at the upper end is closed by the retainer 12, A space in the housing main body 21 is defined as a raw water space 21A to be filled with raw water (that is a target to be filtrated by the hollow fiber membranes 11).

The upper cap 23 is attached to the upper end of the housing main body 21 by the upper coupling 27 to cover the opening at the upper end of the housing main body 21. A space in the upper cap 23 is defined as a filtrated water space 23B to be filled with filtrated water. The filtrated water space 23B communicates with the space defined by the inner surfaces of the hollow fiber membranes 11, but is liquid-tightly partitioned from the raw water space 21A across the retainer 12. Accordingly, it is possible to prevent the raw water and the filtrated water from mixing with each other. As shown in FIG. 1, the upper cap 23 has a peripheral part formed with a filtrated water port 23A for taking out the filtrated water from the filtrated water space 23B to the outside therethrough.

The lower cap 25 is attached to the lower end of the housing main body 21 by the lower coupling 28 to cover the opening at the lower end of the housing main body 21. The space in the lower cap 25 and the space in the housing main body 21 communicate with each other.

As shown in FIG. 1, the lower cap 25 has a peripheral part formed with a port 25A for draining to discharge the raw water from the housing 20 to the outside. The port 25A has a cylindrical shape extending radially outward from the peripheral surface of the lower cap 25, and an inner space communicating with the space in the lower cap 25. Moreover, a draining pipe 22 is connected to the port 25A.

The port 25A for draining serves as a port for allowing a cleaning gas (e.g., cleaning air) for cleaning the hollow fiber membrane bundle 10 to inflow therethrough. Specifically, as shown in FIG. 1, the draining pipe 22 is formed with an inlet 22A for the cleaning gas. A gas pipe 24A is connected to the inlet 22A. Further, a pure cleaning gas generated in a gas generating source 24 such as an air compressor can enter the lower cap 25 through the port 25A after sequentially passing through the gas pipe 24A and the draining pipe 22.

The diffuser 30 diffuses the cleaning gas having entered the housing 20 through the port 25A to the hollow fiber membrane bundle 10. The diffusion generates bubbles to rise from lower ends to upper ends of the hollow fiber membranes 11, resulting in achievement of cleaning the hollow fiber membranes 11. The diffuser 30 is made of, for example, resin such as the PVC like the housing 20, and lies under the hollow fiber membrane bundle 10. Details of the structure of the diffuser 30 will be described later.

The water flow pipe 40 is a member for causing the raw water to enter the housing 20, and is arranged in the housing 20. As shown in FIG. 1, the water flow pipe 40 penetrates through the bottom surface of the lower cap 25 at the center thereof and through the center of the diffuser 30, and vertically extends in an inside space defined by the hollow fiber membrane bundle 10. The water flow pipe 40 has, for example, a hollow cylindrical shape, and further has an upper end retained by the retainer 12 and a lower end formed with a raw water inflow port 44. The water flow pipe 40 also has a wall formed with a plurality of water passing holes 41 at intervals in the longitudinal and circumferential directions thereof. The raw water having flowed into the water flow pipe 40 through the raw water inflow port 44 advances upward from the lower end to the upper end of the water flow pipe 40 therein, and is supplied into the raw water space 21A through the water passing holes 41.

A pipe partition plate 42 vertically dividing a pipe inner space is provided near the upper end of the water flow pipe 40. All the water passing holes 41 are formed in the pipe wall below the pipe partition plate 42. The pipe partition plate 42 can block the raw water there, and hence keep the raw water in the water flow pipe 40 from outflowing beyond the upper end thereof.

As shown in FIG. 1, the wall of the water flow pipe 40 is further formed with air venting holes 43 above the pipe partition plate 42 and below the retainer 12 in the water flow pipe 40. The upper end of the water flow pipe 40 is connected with an air venting pipe 26 communicating with the water flow pipe 40. The air venting pipe 26 penetrates through a top surface of the upper cap 23 at the center thereof. This configuration makes it possible to vent the air having flowed from the raw water space 21A into a space (above the pipe partition plate 42) in the water flow pipe 40 through the air venting holes 43 to the outside of the module through the air venting pipe 26.

Figure 2:
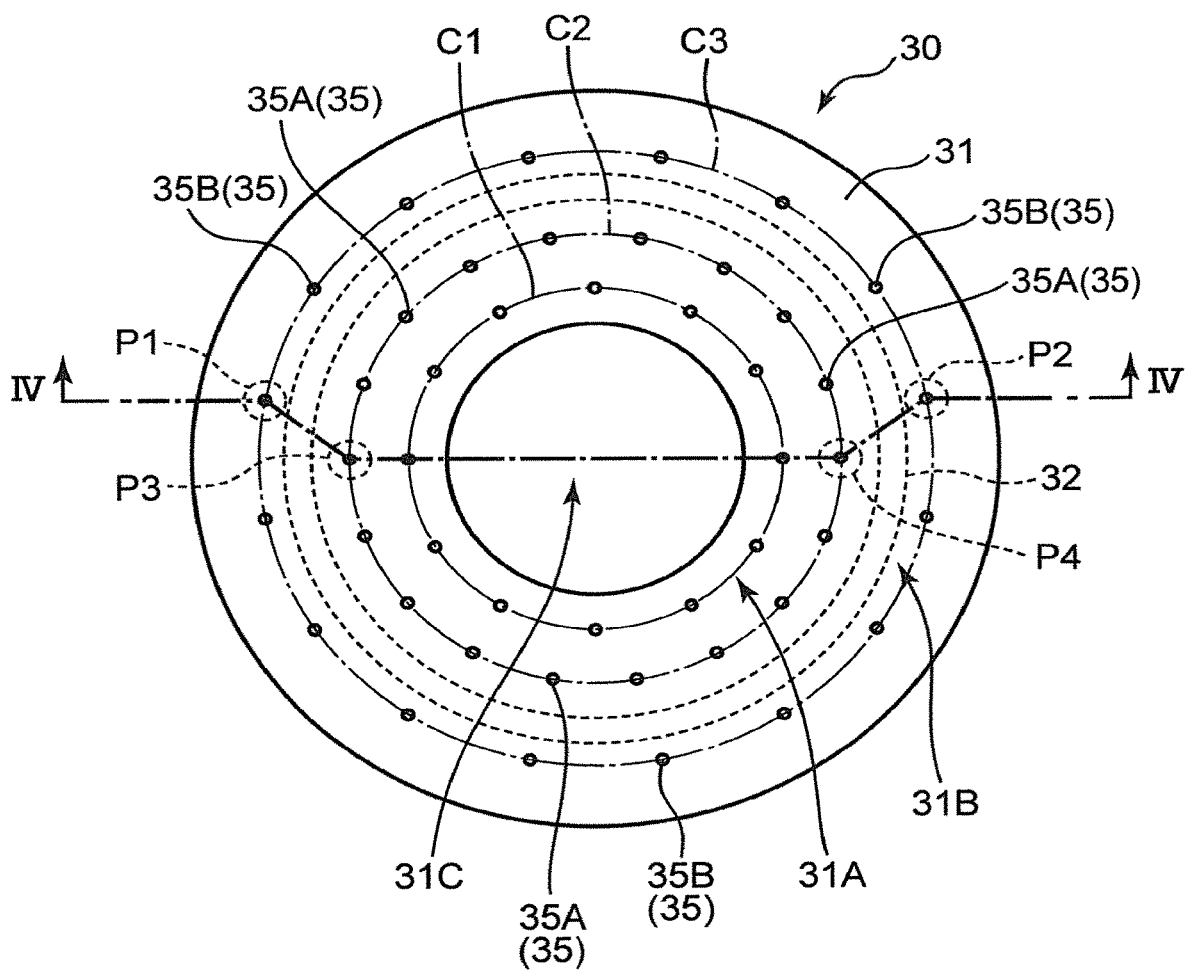
FIG. 2 is a plan view of a diffuser in the first embodiment of the present invention.
Figure 3:
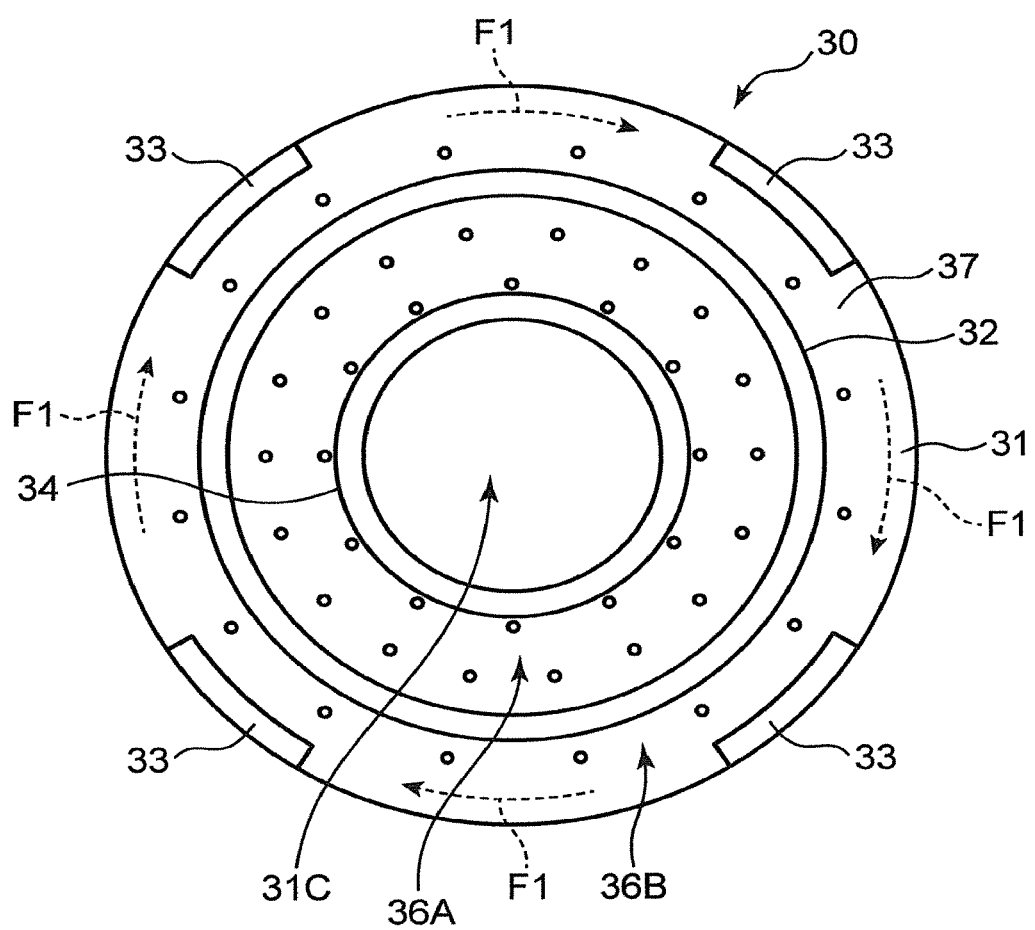
FIG. 3 is a bottom view of the diffuser in the first embodiment of the present invention.
Figure 4:
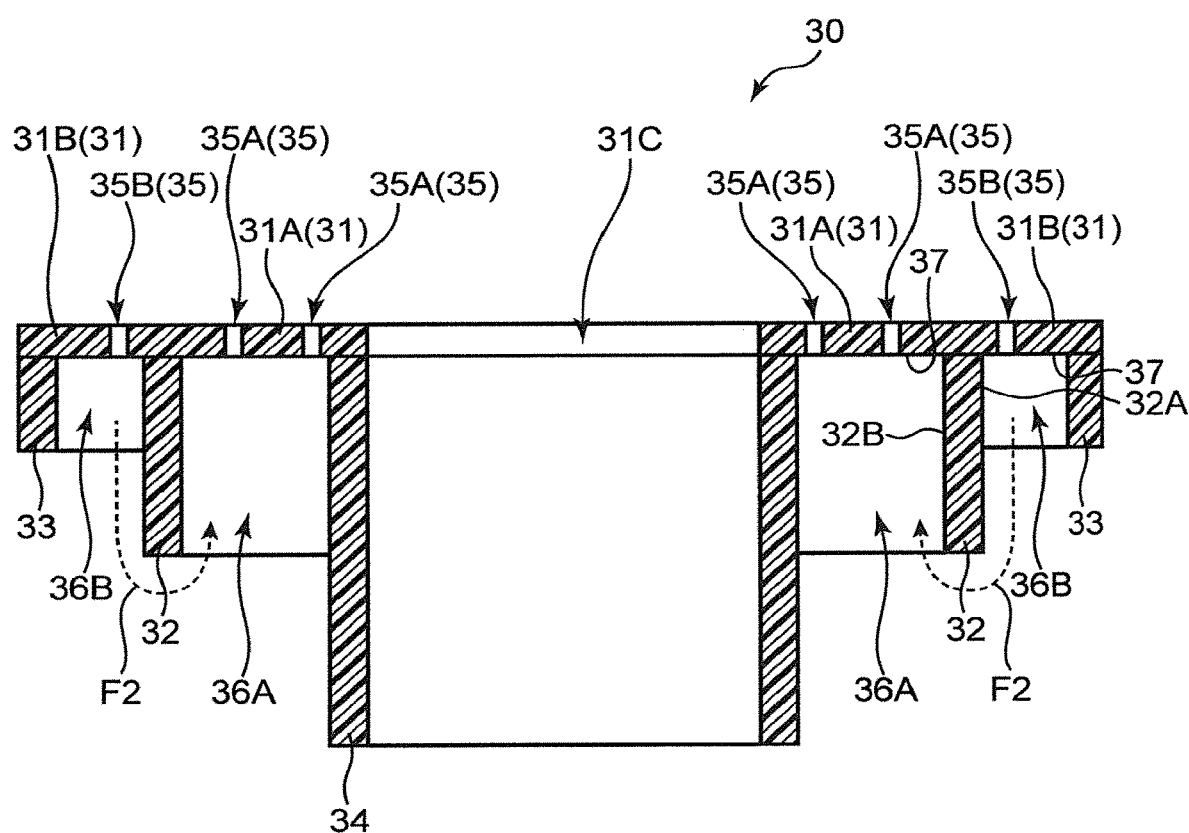
FIG. 4 shows a cross section of the diffuser taken along the line IV-IV in FIG. 2.

Now, details of the structure of the diffuser 30 will be described with reference to FIGS. 1 to 4. FIG. 2 is a plan view of the diffuser 30 (a view of the diffuser 30 seen from the top thereof). FIG. 3 is a bottom view of the diffuser 30 (a view of the diffuser 30 seen from the bottom thereof). FIG. 4 is a cross-sectional view of the diffuser 30 taken along the line IV-IV in FIG. 2.

The diffuser 30 has a receiving surface 37 for receiving the cleaning gas having entered through the port 25A, the receiving surface 37 being formed with diffusion holes 35 for diffusing the cleaning gas to the hollow fiber membrane bundle 10 in the housing 20. As shown in FIGS. 1 to 4, the diffuser 30 includes a disc-shaped main body 31 having the receiving surface 37 formed with a plurality of diffusion holes 35, and a partition 32 dividing a space under the receiving surface 37 into an inner space 36A and an outer space 36B.

As shown in FIGS. 2 and 3, the main body 31 is a disc-shaped member made of resin and having a through hole 31C at the center thereof, and expands in radial directions of the hollow fiber membrane bundle 10. As shown in FIG. 1, the main body 31 lies in a horizontal posture perpendicular to the longitudinal direction of the hollow fiber membranes 11 below the lower ends of the hollow fiber membranes 11. The through hole 31C receives the water flow pipe 40 inserted therein, and thus has a diameter larger than an outer diameter of the water flow pipe 40. The main body 31 should not be limited to the disc shape, and can have various shapes.

Each of the diffusion holes 35 is a circular hole having a diameter smaller than that of the through hole 31C, and extends through the main body 31 in the thickness direction thereof. As shown in FIG. 2, the diffusion holes 35 are at intervals in the radial and circumferential directions in a radially outward area of the through hole 31C. Specifically, defined are a first imaginary circle C1 which is concentric with the main body 31 and has a diameter larger than that of the through hole 31C, a second imaginary circle C2 which is concentric with the main body 31 and has a diameter larger than that of the first imaginary circle C1, and a third imaginary circle C3 which is concentric with the main body 31 and has a diameter larger than that of the second imaginary circle C2. Under this definition, the diffusion holes 35 are arranged at constant intervals on the circumferential outline of each of the first to third imaginary circles C1 to C3.

As shown in FIG. 2, diffusion holes 35 in a radially inward portion (an inner portion 31A) of the partition 32 is more densely arranged than diffusion holes 35 in a radially outward portion (an outer portion 31B) of the partition 32. In the description below, each of the diffusion holes 35 in the inner portion 31A is also referred to as "inner diffusion hole 35A" and each of the diffusion holes 35 in the outer portion 31B is also referred to as "outer diffusion hole 35B". In the embodiment, all the diffusion holes 35 have the same size and the same shape, but may have different sizes and shapes from one another without limitation thereto.

The receiving surface 37 is the lower surface of the main body 31. In other words, the receiving surface 37 is the surface of the main body 31 which faces the lower part of the housing 20 that is opposite to the hollow fiber membrane bundle 10. That is to say, the receiving surface 37 vertically faces an inner bottom surface of the housing 20. Moreover, the receiving surface 37 extends in a horizontal direction perpendicular to the longitudinal direction of the hollow fiber membranes 11. The cleaning gas having entered the housing 20 through the port 25A is received on the receiving surface 37, and thereafter diffuses to the hollow fiber membrane bundle 10 through the diffusion holes 35.

As shown in FIGS. 3 and 4, the partition 32 has a cylindrical shape with a diameter larger than that of the through hole 31C, and has an upper end connected to the receiving surface 37 so as to be concentric with the main body 31. The space on the radially inside of the partition 32 is defined as the inner space 36A and the space on the radially outside of the partition 32 is defined as the outer space 36B under the receiving surface 37. Specifically, the inner space 36A locates under the inner portion 31A of the main body 31, and the outer space 36B locates under the outer portion 31B of the main body 31. The inner space 36A and the outer space 36B can store the cleaning gas to diffuse through the diffusion holes 35.

As shown in FIG. 3, the inner space 36A is an annular space surrounding the through hole 31C in a plan view, and the outer space 36B is another annular space surrounding the inner space 36A in the plan view. As shown in FIG. 4, the partition 32 has an outer peripheral surface 32A facing the outer space 36B and vertically extending, and an inner peripheral surface 32B facing the inner space 36A and vertically extending.

The partition 32 in the embodiment has a cylindrical shape with a predetermined inner diameter from the upper end to the lower end thereof, but should not be limited to this shape. The partition 32 may have a shape with a diameter gradually increasing or decreasing from the upper end to the lower end. Besides, the partition 32 should not be limited to the cylindrical shape, and may have any other shape, e.g., a prism shape.

The diffuser 30 further includes an inner cylindrical portion 34, and peripheral wall portions 33. As shown in FIGS. 3 and 4, the inner cylindrical portion 34 has a cylindrical shape with almost the same diameter as that of the through hole 31C, and has an upper end connected to the receiving surface 37 so as to be concentric with the main body 31. The inner cylindrical portion 34 prevents the cleaning gas stored in the inner space 36A from outflowing through the through hole 31C.

As shown in FIG. 3, the peripheral wall portions 33 (four peripheral wall portions in the embodiment) are provided at intervals in the circumferential direction along the outer edge of the main body 31. As shown in FIG. 4, the peripheral wall portions 33 are connected to the receiving surface 37 on the outer edge of the main body 31, and extend downward from the receiving surface 37. Although the main body 31, the partition 32, the inner cylindrical portion 34, and the peripheral wall portions 33 are independent of one another in the embodiment, they may be integrated together without limitation thereto.

The port 25A is formed at the peripheral part of the housing 20 (the lower cap 25) to allow the cleaning gas to flow into the outer space 36B therethrough. Specifically, as shown in FIG. 1, the port 25A faces the outer space 36B, and is at such a position as to cause the cleaning gas having entered through the port 25A to come into collision with the outer peripheral surface 32A of the partition 32. In the embodiment, the location of the port 25A is determined so that a top 25AA on an inner surface of the port 25A is at a position higher than the lower end of the partition 32. This configuration allows the cleaning gas having entered the housing 20 radially inward through the port 25A to easily come into collision with the outer peripheral surface 32A of the partition 32. It is consequently possible to prevent the cleaning gas from directly flowing into the inner space 36A, and reliably make the cleaning gas flow into the outer space 36B. As described above, the hollow fiber membrane module 1 causes the cleaning gas to enter the housing 20 from an outer periphery side of the diffuser 30 to a radially inside region.

The diffusion holes 35 are arranged to allow at least a part of the cleaning gas flowing in the outer space 36B to diffuse from the inner space 36A to the hollow fiber membrane bundle 10. More specifically, an opening rate of diffusion hole 35 (outer diffusion hole 35B) communicating with the outer space 36B is smaller than an opening rate of diffusion hole 35 (inner diffusion hole 35A) communicating with the inner space 36A.

Here, the opening rate of outer diffusion hole 35B is defined as a rate of total area of all the outer diffusion holes 35B to the entire area of the outer portion 31B of the main body 31. Similarly, the opening rate of inner diffusion hole 35A is defined as a rate of total area of all the inner diffusion holes 35A to the entire area of the inner portion 31A of the main body 31.

The smaller opening rate of outer diffusion hole 35B makes the amount of cleaning gas diffused from the outer space 36B through the outer diffusion holes 35B small. Consequently, the cleaning gas can flow in the outer space 36B thoroughly in the circumferential direction in such a way as to surround the inner space 36A (see arrow F1 in FIG. 3).

The cleaning gas flowing in the outer space 36B can flow into the inner space 36A beyond the partition 32 (arrow F2 in FIG. 4) and then diffuse from the inner space 36A to the hollow fiber membrane bundle 10 through the inner diffusion holes 35A. This contributes to reduction in the bias in the amount of cleaning gas diffused by the diffuser 30 in the circumferential direction even in a configuration where the port 25A is formed at the peripheral part of the housing 20 and the cleaning gas enters the housing 20 from an outer periphery side of the diffuser 30. As a result, the hollow fiber membrane bundle 10 can be cleaned uniformly in the circumferential direction with the gas.

The diffusion holes 35 have an arrangement of making an amount of cleaning gas diffused from the outer space 36B to the hollow fiber membrane bundle 10 smaller than an amount of cleaning gas having flowed into the outer space 36B through the port 25A. Specifically, adjustment of the opening rate of outer diffusion hole 35B makes the amount of cleaning gas diffused from the outer space 36B smaller than the amount of cleaning gas having flowed into the outer space 36B. This configuration can ensure overflow of the cleaning gas in the outer space 36B, and thus reliably allows the cleaning gas to flow from the outer space 36B into the inner space 36A.

<Method for Cleaning a Hollow Fiber Membrane Module>

Next, a method for cleaning a hollow fiber membrane module according to the first embodiment of the present invention will be described in accordance with a flowchart shown in FIG. 5. In the beginning, a filtration of raw water to be performed by the hollow fiber membrane module 1 in advance of the cleaning method will be described.

Figure 5:
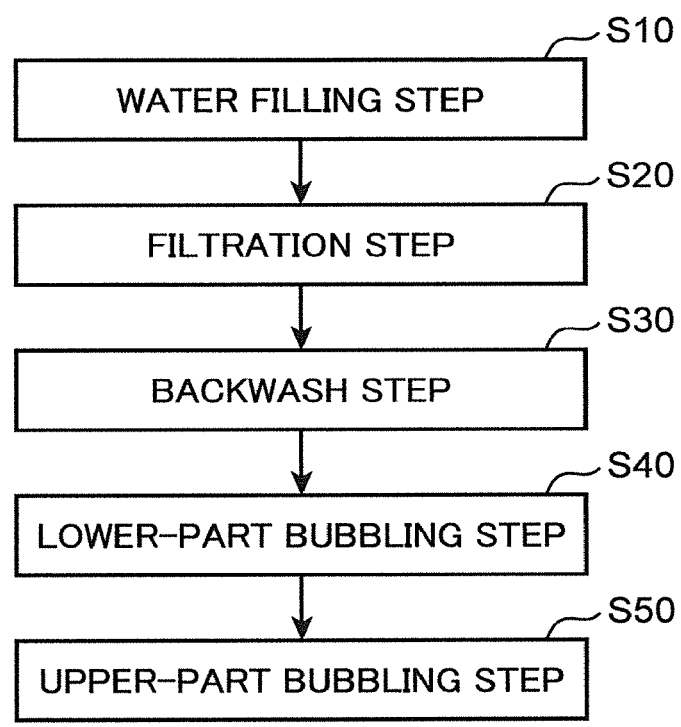
FIG. 5 is a flowchart showing a sequence of a method for cleaning a hollow fiber module according to the first embodiment of the present invention.
Figure 6:
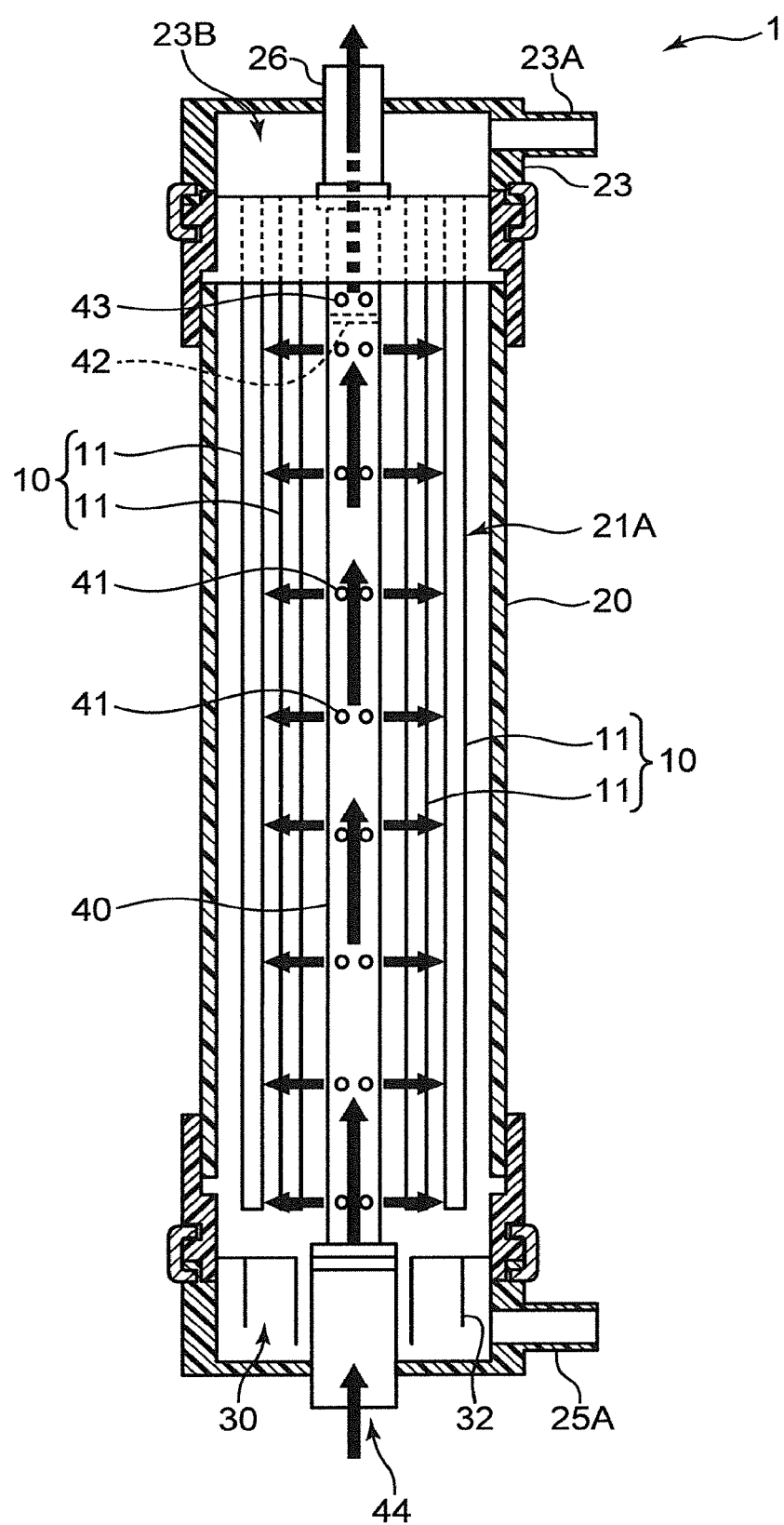
FIG. 6 is a schematic diagram explaining a water filling step in connection with the method for cleaning the hollow fiber membrane module according to the first embodiment of the present invention.

First, raw water sent from a raw water tank (not shown) by a pump is flowed into a water flow pipe 40 through a water inflow port 44 in a water filling step (FIG. 5: step S10). As shown in FIG. 6, the raw water advances from a lower end to an upper end of the water flow pipe 40 therein, and flows into a raw water space 21A through water passing holes 41. In this manner, the raw water space 21A is filled with the raw water. At this time, an air in the raw water space 21A flows into a space (above a pipe partition plate 42) in the water flow pipe 40 through air venting holes 43 in accordance with the inflow of the raw water, and then is vented to the outside of a housing 20 through an air venting pipe 26.

Figure 7:
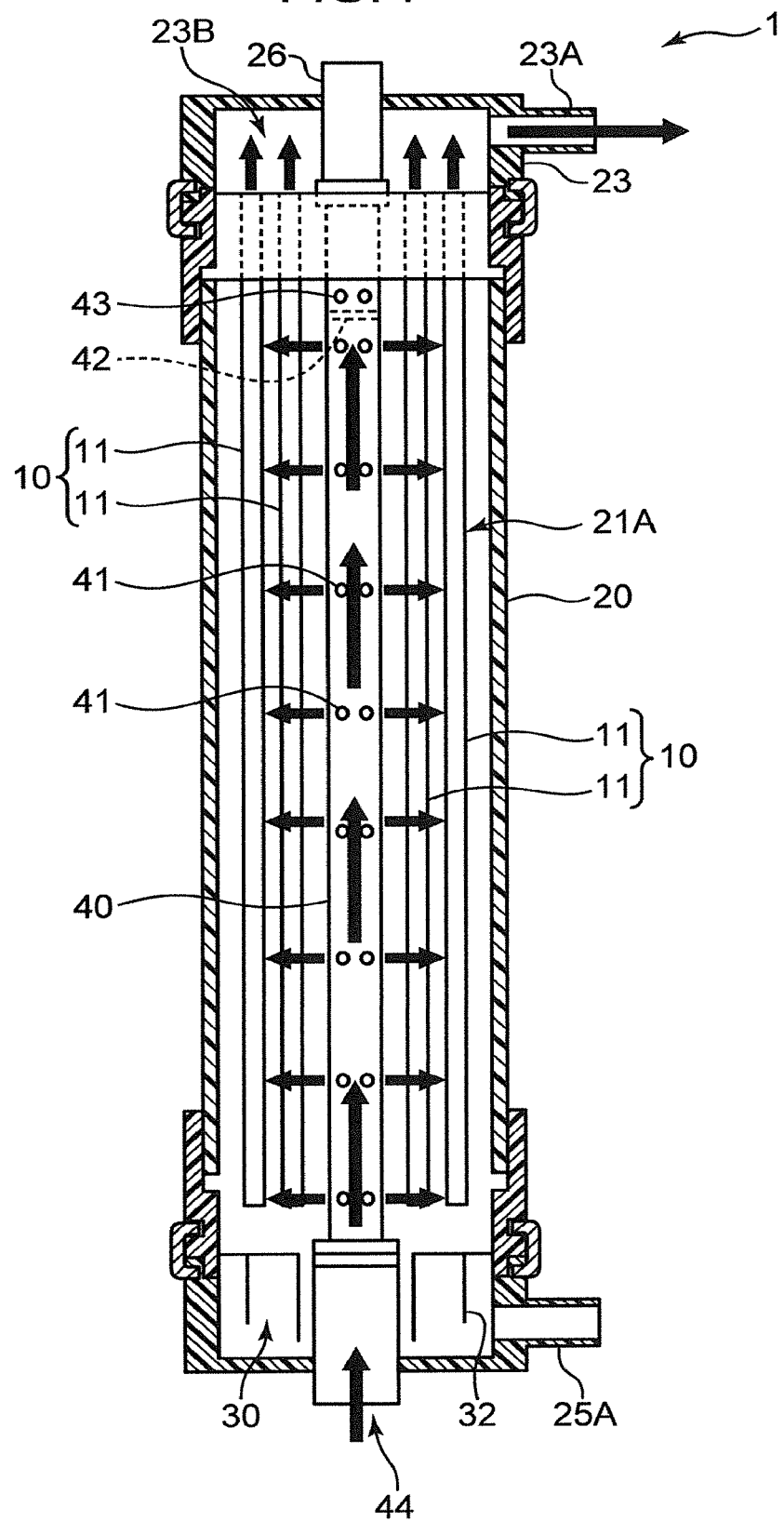
FIG. 7 is a schematic diagram explaining a filtration step in connection with the method for cleaning the hollow fiber membrane module according to the first embodiment of the present invention.

Subsequently, the raw water supplied into the raw water space 21A is caused to permeate hollow fiber membranes 11 from outer surfaces to inner surfaces thereof through the membrane walls in a filtration step (FIG. 5: step S20). Filtrated water is obtained after impurities such as the SS are removed owing to this step. As shown in FIG. 7, the filtrated water outflows from an upper end of each hollow fiber membrane 11 to flow into a filtrated water space 23B, and thereafter is taken out to the outside through a filtrated water port 23A.

Here, the SS contained in the raw water may be deposited onto the outer surfaces of the hollow fiber membranes 11 in accordance with a lapse of a period of filtration time, resulting in plugging pores of the hollow fiber membranes 11. In this case, a permeation flow rate of the raw water decreases, and accordingly the filtration performance of the hollow fiber membranes 11 declines. For this reason, a method for cleaning a hollow fiber membrane module according to the embodiment described below is performed after a lapse of a predetermined period of time from start of the filtration to clean a hollow fiber membrane bundle 10.

Figure 8:
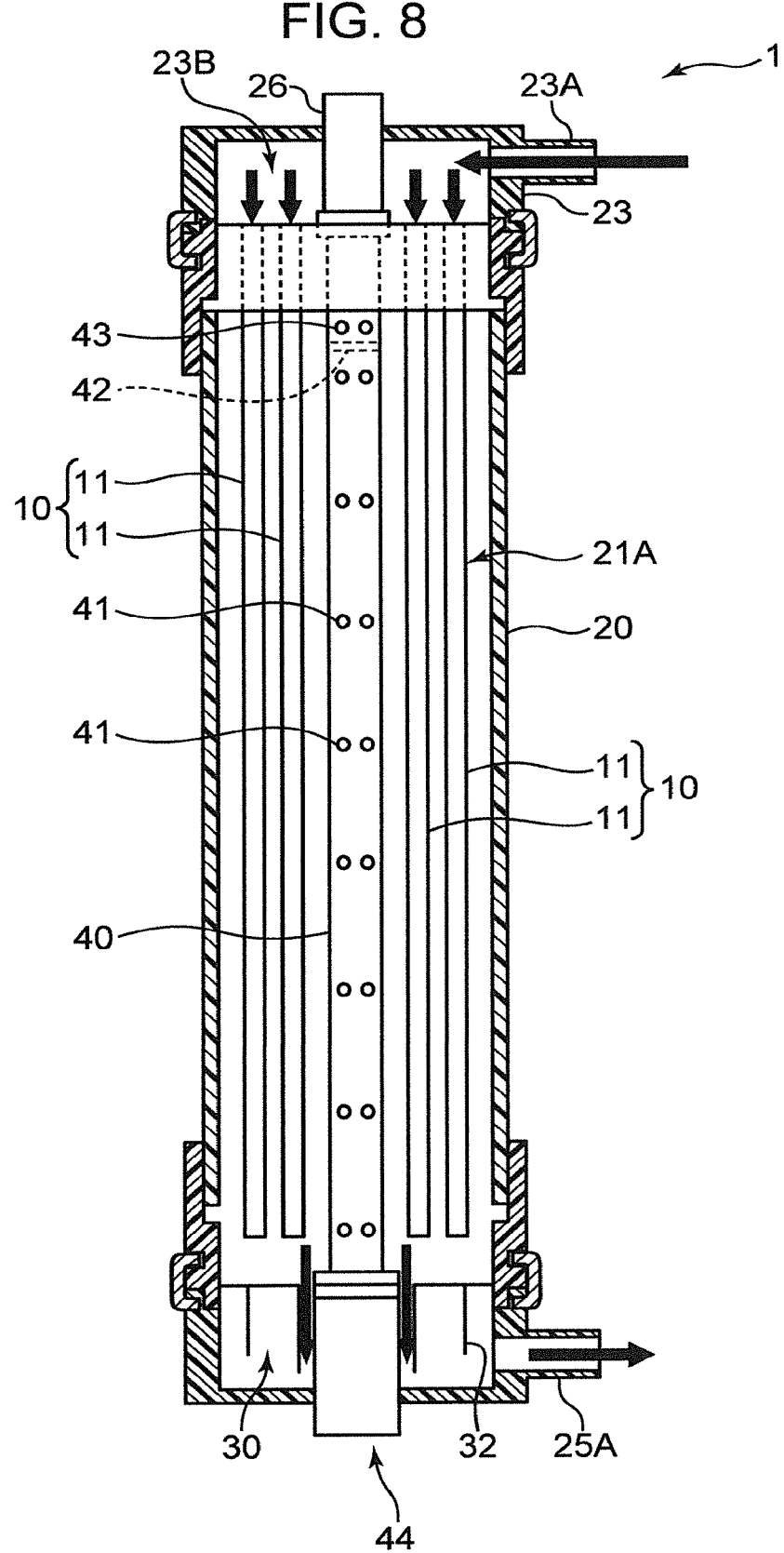
FIG. 8 is a schematic diagram explaining a backwash step in the method for cleaning the hollow fiber membrane module according to the first embodiment of the present invention.

In this cleaning method, first, a backwash step (FIG. 5: step S30) is executed. In this step, a compressed air generated by an air compressor or the like is introduced into the filtrated water space 23B through the filtrated water port 23A as shown in FIG. 8. The compressed air increases the pressure of the filtrated water in the space defined by the inner surfaces of the hollow fiber membranes 11 to thereby press out the filtrated water from the inner surfaces to the outer surfaces of the hollow fiber membranes 11. The increased water pressure can weaken an adhesion force of the SS deposited on the outer surfaces of the hollow fiber membranes 11. Besides, the water in the raw water space 21A is discharged to the outside of the housing 20 through a port 25A for draining after passing through the gap between a hole wall defining a through hole 31C of a diffuser 30 and an outer peripheral surface of the water flow pipe 40.

Figure 9:
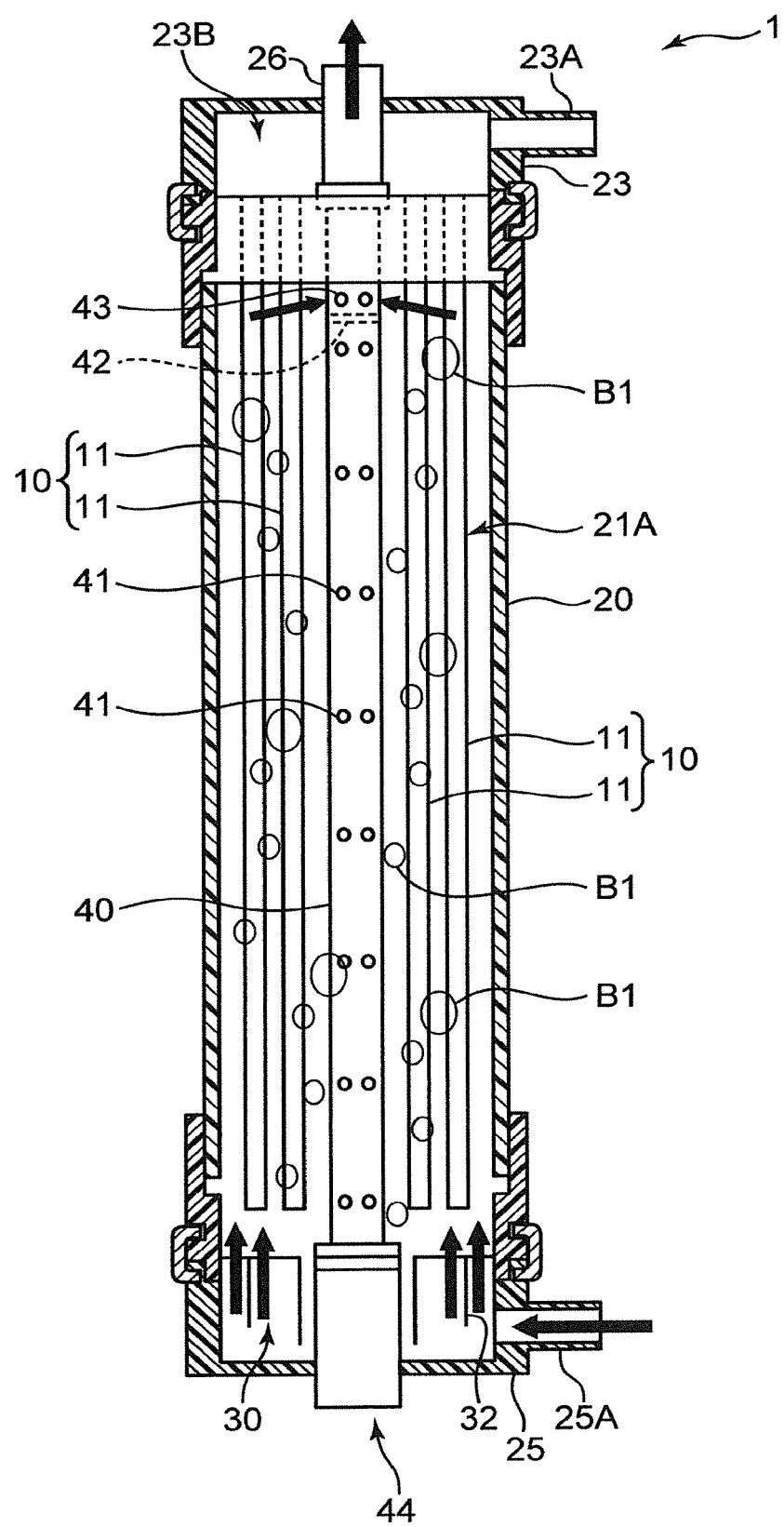
FIG. 9 is a schematic diagram explaining a lower-part bubbling step in the method for cleaning the hollow fiber membrane module according to the first embodiment of the present invention.

Subsequently, a lower-part bubbling step (FIG. 5: step S40) is executed as described below. First, a cleaning gas (a cleaning air) is introduced into the housing 20 (a lower cap 25) through a port 25A for allowing the cleaning gas to inflow in a state where the raw water space 21A is filled with the raw water as shown in FIG. 9. Then, the cleaning gas is flowed into an outer space 36B (FIGS. 3, 4) under a receiving surface 37 of the diffuser 30 through the port 25A.

The cleaning gas is introduced into the housing 20 through the port 25A to come into collision with an outer peripheral surface 32A of a partition 32. This can prevent the cleaning gas from directly flowing into an inner space 36A, and reliably flow the cleaning gas into the outer space 36B. The cleaning gas is received on the receiving surface 37 radially outward of the partition 32.

Further, as denoted by arrow F1 in FIG. 3, the cleaning gas is flowed in the outer space 36B thoroughly in the entire circumferential direction in such a way as to surround the inner space 36A. The reason why the cleaning gas can flow in the outer space 36B thoroughly in the circumferential direction lies in that an opening rate of outer diffusion hole 35B is smaller and an amount of cleaning gas diffused from the outer space 36B through outer diffusion holes 35B is suppressed, as described above. The cleaning gas diffuses even in a small amount through the outer diffusion holes 35B while flowing thoroughly in the outer space 36B.

In the introducing of the cleaning gas, a larger amount of cleaning gas is flowed into the outer space 36B than the amount of cleaning gas diffused from the outer space 36B to the hollow fiber membrane bundle 10 through the outer diffusion holes 35B. This can consequently ensure overflow of the cleaning gas in the outer space 36B. And thus, at least a part of the cleaning gas flowing in the outer space 36B flows into the inner space 36A as denoted by arrow F2 in FIG. 4.

The cleaning gas having flowed into the inner space 36A is diffused to the hollow fiber membrane bundle 10 through inner diffusion holes 35A. Also, the cleaning gas remaining in the outer space 36B without flowing into the inner space 36A is diffused to the hollow fiber membrane bundle 10 through the outer diffusion holes 35B. Owing to the diffusion, bubbles B1 rises from lower ends to upper ends of the hollow fiber membranes 11 as shown in FIG. 9. The hollow fiber membranes 11 having received the risen bubbles B1 swing, and accordingly the SS deposited on the membrane surfaces fall off therefrom.

Figure 10:
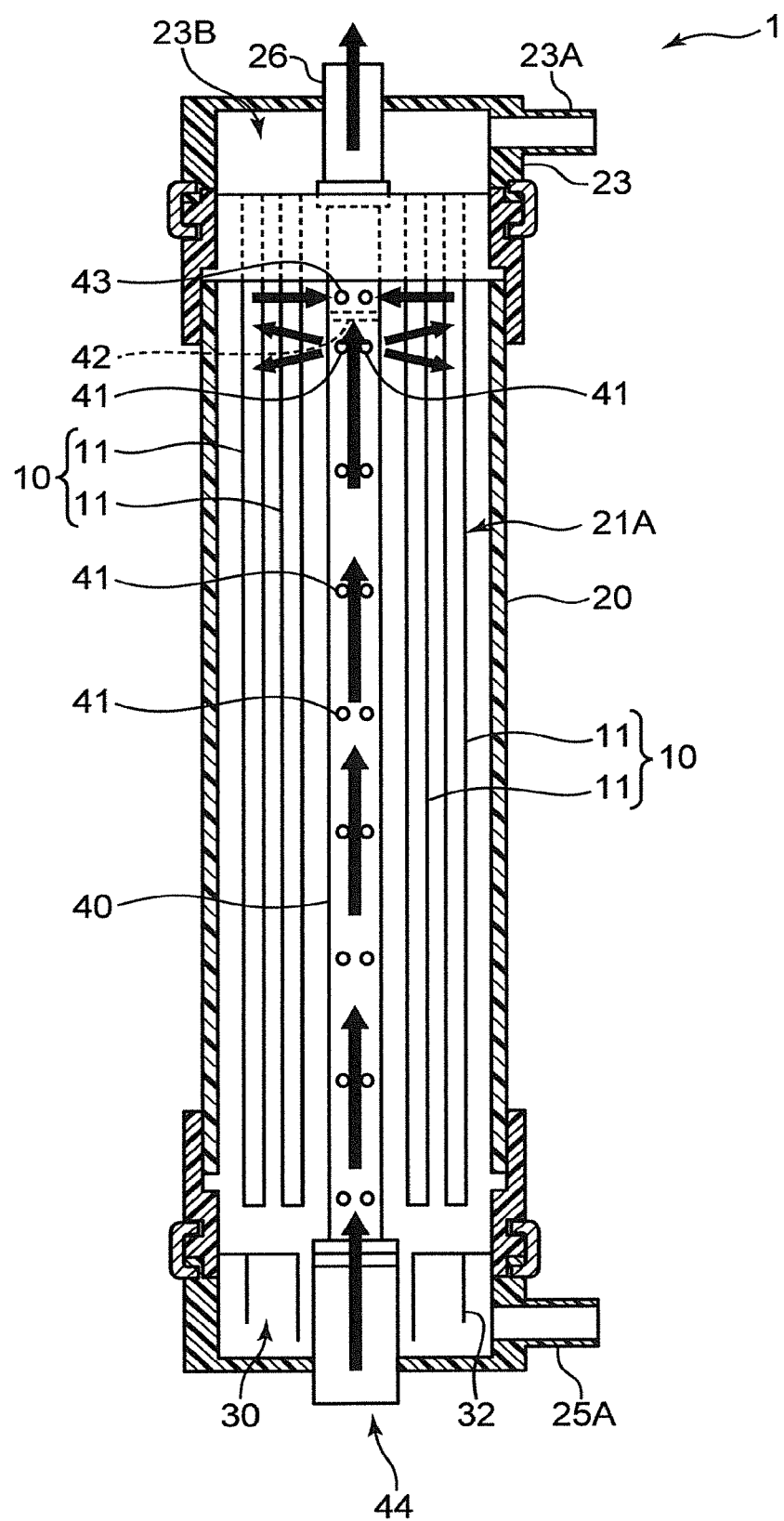
FIG. 10 is a schematic diagram explaining an upper-part bubbling step in the method for cleaning the hollow fiber membrane module according to the first embodiment of the present invention.

Subsequently, a cleaning gas (a cleaning air) is introduced into the water flow pipe 40 through the raw water inflow port 44 in an upper-part bubbling step (FIG. 5: step S50) as shown in FIG. 10. The cleaning gas rises in the water flow pipe 40 to come into collision with a pipe partition plate 42, and is supplied into the raw water space 21A through the water passing holes 41 just below the pipe partition plate 42. In this manner, it is possible to clean a portion of the hollow fiber membranes 11 near the upper ends thereof with the bubbles. The cleaning gas in the raw water space 21A flows into a space (above the pipe partition plate 42) in the water flow pipe 40 through air venting holes 43, and is vented to the outside of the housing 20 through an air venting pipe 26.

Thereafter, the raw water containing the SS removed from the membrane surfaces is discharged to the outside of the housing 20 through the port 25A for draining, and the method for cleaning the hollow fiber membrane module according to the embodiment finishes. After that, the aforementioned water filling step and filtration step are resumed. As described above, use of the diffuser 30 having the partition 32 in the lower-part bubbling step in the method for cleaning the hollow fiber membrane module according to the embodiment contributes to reduction in the bias in the amount of cleaning gas diffused by the diffuser 30 in the circumferential direction even in a case where the cleaning gas is introduced from the outer periphery side of the diffuser 30. Consequently, it is possible to clean the hollow fiber membrane bundle 10 uniformly in the circumferential direction with the gas.

OTHER EMBODIMENTS

Hereinafter, other embodiments of the present invention will be described.

Although described in the first embodiment is that the cleaning gas having entered through the port 25A comes into collision with the outer peripheral surface 32A of the partition 32, the configuration should not be limited thereto. For example, the port 25A may be at a position further lower than its position shown in FIG. 1 (so that the top 25AA locates below the lower end of the partition 32) without causing the cleaning gas to come into collision with the outer peripheral surface 32A. Even in this case, the cleaning gas having entered the lower cap 25 rises by receiving buoyancy, and hence can flow into the outer space 36B.

The location of the port 25A should not be limited to the peripheral part of the housing 20. For example, the port 25A may locate in the lower part of the housing 20 (lower cap 25) at a position deviated radially outward from the center thereof so that the cleaning gas can flow into the outer space 36B.

Although described in the first embodiment is that the inner diffusion holes 35A and outer diffusion holes 35B are arranged, the configuration should not be limited thereto. For instance, the main body 31 may be formed with only the inner diffusion holes 35A without the outer diffusion holes 35B. Even in this configuration, the cleaning gas can flow in the outer space 36B thoroughly. Moreover, the cleaning gas having flowed from the outer space 36B into the inner space 36A beyond the partition 32 can diffuse to the hollow fiber membrane bundle 10 like the first embodiment.

Although described in the first embodiment is that the port 25A for allowing the cleaning gas to inflow therethrough serves as the port 25A for draining to discharge the raw water, the configuration should not be limited thereto. For instance, a port for allowing the cleaning gas to inflow therethrough and a port for draining to discharge the raw water may be independently provided at different positions in the housing 20.

Figure 11:
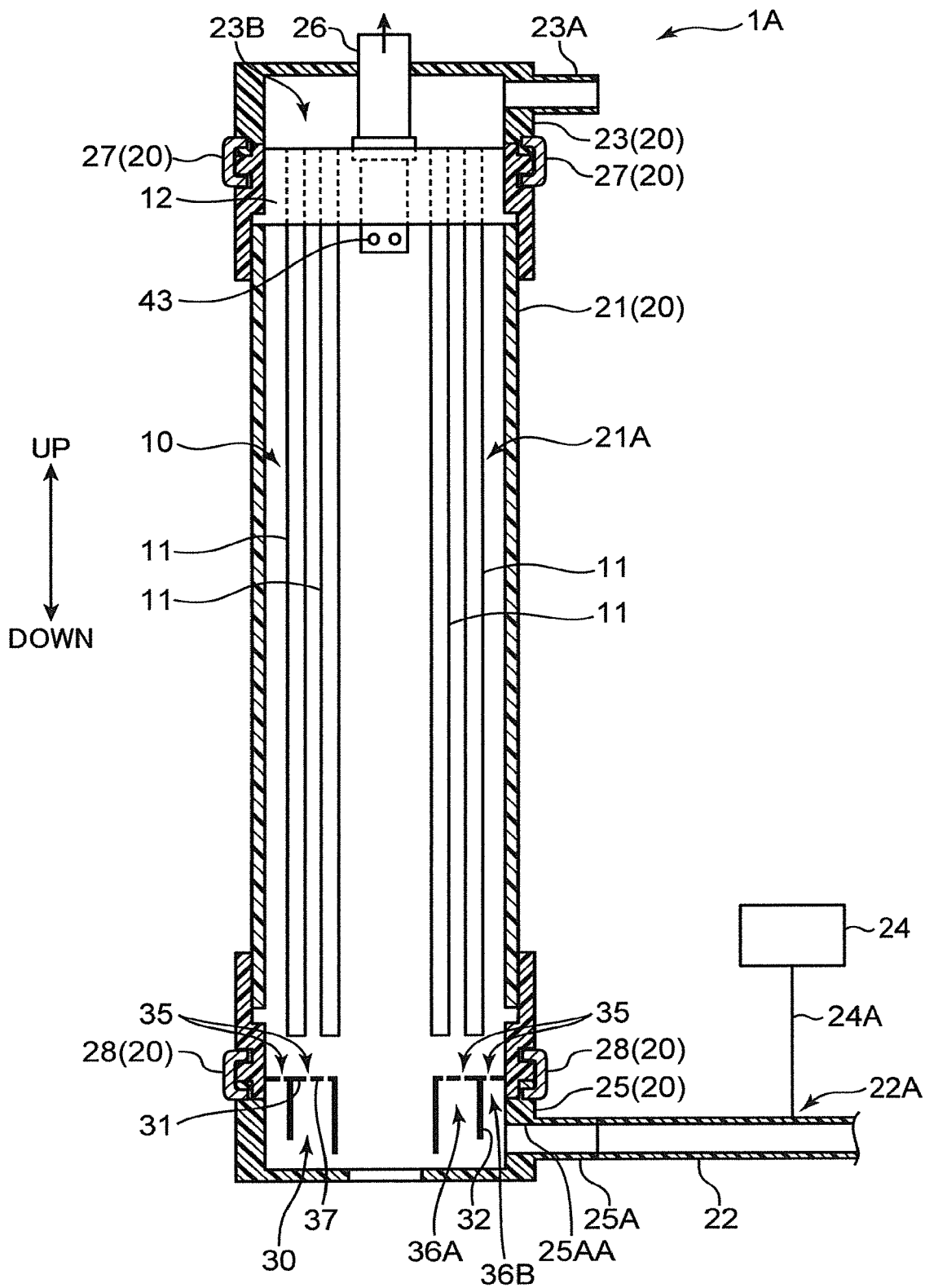
FIG. 11 schematically shows a configuration of a hollow fiber membrane module according to another embodiment of the present invention.

Although described in the first embodiment is that the raw water is supplied into the housing 20 through the water passing holes 41 of the water flow pipe 40, the configuration should not be limited thereto. Like a hollow fiber membrane module 1A shown in FIG. 11, a specific portion of the water flow pipe 40 formed with the water passing holes 41 may be omitted, and the raw water may enter the housing 20 (lower cap 25) through a raw water inflow port provided in the lower part of the housing 20 (lower cap 25).

Although described in the first embodiment is that the hollow fiber membrane bundle 10 has the one-free-end structure, the configuration should not be limited thereto. The hollow fiber membrane bundle 10 may have a structure in which both ends are retained.

Although described in the first embodiment is that only the single partition 32 is provided, the configuration should not be limited thereto. A plurality of partitions 32 having different diameters from each other may be connected to the receiving surface 37.

Although described in the first embodiment is that the lower-part bubbling step and the upper-part bubbling step are executed, the configuration should not be limited thereto. The upper-part bubbling step may be excluded. Moreover, the steps should not be limited to the sequence of firstly executing the lower-part bubbling step and thereafter executing the upper-part bubbling step. The lower-part bubbling step may be executed after the upper-part bubbling step.

Although described as an exemplary cleaning gas is an air in the first embodiment, the cleaning gas should not be limited thereto. Any other type of gas suitable for cleaning the hollow fiber membranes 11 is adoptable.

Hereinafter, the embodiments will be briefly described.

A hollow fiber membrane module according to the embodiment is a hollow fiber membrane module for an external pressure filtration including: a hollow fiber membrane bundle including bundled hollow fiber membranes; a housing formed with a port for allowing a cleaning gas for cleaning the hollow fiber membrane bundle to inflow therethrough for accommodating the hollow fiber membrane bundle; and a diffuser having a receiving surface for receiving the cleaning gas having entered through the port, the receiving surface being formed with diffusion hole for diffusing the cleaning gas to the hollow fiber membrane bundle in the housing. The diffuser includes a partition dividing a space under the receiving surface into an inner space and an outer space surrounding the inner space and permitting the cleaning gas having entered through the port to flow thereinto. The diffusion hole is arranged to allow at least a part of the cleaning gas flowing in the outer space to diffuse from the inner space to the hollow fiber membrane bundle.

The hollow fiber membrane module permits the cleaning gas having entered the housing to flow into the outer space of the diffuser, and further permits the cleaning gas flowing in the outer space to flow into the inner space to diffuse therefrom to the hollow fiber membrane bundle. This configuration contributes to reduction in the bias in the amount of cleaning gas diffused in the circumferential direction. Consequently, the hollow fiber membrane bundle can be cleaned uniformly in the circumferential direction with the cleaning gas even having entered from the outer periphery side of the diffuser, which leads to an increased permissible range of locations of the port for the cleaning gas.

In the hollow fiber membrane module, the port may face the outer space.

According to this configuration, the cleaning gas can easily flow into the outer space through the port, and hence the cleaning gas can be reliably stored in the outer space.

In the hollow fiber membrane module, the partition may have an outer peripheral surface facing the outer space. The port may be at such a position as to cause the cleaning gas having entered therethrough to come into collision with the outer peripheral surface.

According to this configuration, it is possible to prevent the cleaning gas from directly flowing into the inner space by causing the cleaning gas to come into collision with the outer peripheral surface of the partition, and reliably make the cleaning gas flow into the outer space.

In the hollow fiber membrane module, an opening rate of diffusion hole communicating with the outer space may be smaller than an opening rate of diffusion hole communicating with the inner space.

This configuration ensures the flow of the cleaning gas over a wide range in the outer space by making the amount of cleaning gas to diffuse from the outer space through the diffusion holes smaller.

In the hollow fiber membrane module, the diffusion holes may have an arrangement of making an amount of cleaning gas diffused from the outer space to the hollow fiber membrane bundle smaller than an amount of cleaning gas having flowed into the outer space through the port.

In this configuration, the amount of cleaning gas diffused from the outer space is smaller than the amount of cleaning gas having flowed into the outer space. This can ensure overflow of the cleaning gas in the outer space. The cleaning gas overflowed from the outer space can flow into the inner space and diffuse from the inner space to the hollow fiber membrane bundle through the diffusion holes.

A method for cleaning a hollow fiber membrane module according to the embodiment is a method for cleaning a hollow fiber membrane module for an external pressure filtration by cleaning a hollow fiber membrane bundle of the hollow fiber membrane module, the hollow fiber membrane module including: a housing formed with a port for allowing a cleaning gas to inflow therethrough; the hollow fiber membrane bundle accommodated in the housing; and a diffuser having a receiving surface formed with diffusion hole for diffusing the cleaning gas to the hollow fiber membrane bundle in the housing, and defining an inner space and an outer space surrounding the inner space under the receiving surface The method includes: flowing the cleaning gas into the outer space under the receiving surface of the diffuser through the port; flowing at least a part of the cleaning gas flowing in the outer space into the inner space; and diffusing the cleaning gas to the hollow fiber membrane bundle through the diffusion hole.

According to the cleaning method, it is possible to flow the cleaning gas having entered through the port into the outer space of the diffuser, flow the cleaning gas flowing in the outer space into the inner space, and diffuse the cleaning gas to the hollow fiber membrane bundle. This contributes to reduction in the bias in the amount of cleaning gas diffused in the circumferential direction even in a case where the cleaning gas is introduced from the outer periphery side of the diffuser. Consequently, it is possible to clean the hollow fiber membrane bundle uniformly in the circumferential direction with the gas.

In the method for cleaning a hollow fiber membrane module, the cleaning gas may be introduced into the housing through the port to come into collision with an outer peripheral surface of a partition interposed between the inner space and the outer space, the outer peripheral surface facing the outer space.

According to this method, it is possible to prevent the cleaning gas from directly flowing into the inner space, and reliably flow the cleaning gas into the outer space.

In the method for cleaning a hollow fiber membrane module, a larger amount of cleaning gas may be flowed into the outer space than an amount of cleaning gas diffused from the outer space to the hollow fiber membrane bundle.

This method can ensure overflow of the cleaning gas in the outer space. Further, it is possible to flow the cleaning gas overflowed from the outer space into the inner space, and diffuse the cleaning gas from the inner space to the hollow fiber membrane bundle through the diffusion holes.

Test Example

The following test was performed to confirm advantageous effects of a hollow fiber membrane module and a method for cleaning the same according to the present invention.

First, a hollow fiber membrane module 1 as described above with reference to FIGS. 1 to 4 was prepared, and a cleaning air was introduced into a lower cap 25 at a flow rate of 5 Nm³/h in a state where a housing 20 is filled with water. Then, respective flow rates of cleaning air diffused through diffusion holes 35 denoted by P1 to P4 in FIG. 2 were measured. The diffusion holes 35 denoted by P1, P3 locate closer to a port 25A for allowing the cleaning air to inflow therethrough than the diffusion holes 35 denoted by P2, P4. A diameter of a diffuser 30 was defined as 230 mm, an outer diameter of a partition 32 was defined as 164 mm, a diameter of a through hole 31C was defined as 90 mm, a diameter of each of outer diffusion holes 35B (denoted by P1, P2) was defined as 3 mm, a diameter of each of inner diffusion holes 35A (denoted by P3, P4) was defined as 3.5 mm. Furthermore, as a comparative example, a hollow fiber membrane module excluding the partition 32 from the diffuser 30 of the hollow fiber membrane module 1 was used to measure respective flow rates of cleaning air diffused from corresponding diffusion holes 35 denoted by P1 to P4.

In use of the hollow fiber membrane module 1 including the partition 32, the following results were obtained: the flow rate of cleaning air diffused through the diffusion hole 35 denoted by P1 was 0.15 Nm³/h; the flow rate of cleaning air diffused through the diffusion hole 35 denoted by P2 was 0.14 Nm³/h; the flow rate of cleaning air diffused through the diffusion hole 35 denoted by P3 was 0.08 Nm³/h; and the flow rate of cleaning air diffused through the diffusion hole 35 denoted by P4 was 0.08 Nm³/h. It is clear from comparison between P1 and P2, and comparison between P3 and P4 that a difference seen in the amount of gas diffused through the diffusion holes 35 in the circumferential direction was small in the case of the diffuser 30 including the partition 32.

In contrast, in use of the hollow fiber membrane module excluding the partition 32, the following results were obtained: the flow rate of cleaning air diffused through the diffusion hole 35 denoted by P1 was 0.15 Nm³/h; the flow rate of cleaning air diffused through the diffusion hole 35 denoted by P2 was 0.02 Nm³/h; the flow rate of cleaning air diffused through the diffusion hole 35 denoted by P3 was 0.20 Nm³/h; and the flow rate of cleaning air diffused through the diffusion hole 35 denoted by P4 was 0.03 Nm³/h. It is clear from comparison between P1 and P2, and comparison between P3 and P4 that the difference seen in the amount of gas diffused through the diffusion holes 35 in the circumferential direction was increased. It is seen from these results that use of the hollow fiber membrane module 1 according to the embodiment contributes to suppression of the bias in the amount of gas diffused by the diffuser 30 in the circumferential direction. It should be noted here that the diameter of each of the inner diffusion holes 35A is larger than that of each of the outer diffusion holes 35B. Accordingly, the results show that the flow rate of cleaning gas diffused through the diffusion hole 35 denoted by P3 was larger than the flow rate of cleaning gas diffused through the diffusion hole 35 denoted by P1 in the comparative example.

The above-described embodiments and test example merely show examples in all the aspects, and thus should not be considered to be limited. The scope of the invention should be defined by the scope of claims, not the description of the above-described embodiments, and further cover meanings equivalent to those readable in the scope of claims and all the changes falling within the scope of the claims.

The invention claimed is:

1. A hollow fiber membrane module, comprising:
   a hollow fiber membrane bundle comprising bundled hollow fiber membranes;
   a housing formed with a port for allowing a cleaning gas for cleaning the hollow fiber membrane bundle to inflow therethrough for accommodating the hollow fiber membrane bundle; and
   a diffuser having a receiving surface extending in a horizontal direction perpendicular to a longitudinal direction of the hollow fiber membranes, wherein
   the diffuser comprises a partition dividing a space under the receiving surface into an inner space and an outer space surrounding the inner space,
   the port of the housing is disposed at a position permitting a cleaning gas having entered through the port to flow into the outer space,
   the receiving surface of the diffuser is formed with diffusion holes that open to the inner space,
   the partition functions to cause at least a part of the cleaning gas having entered the outer space through the port to overflow the partition to flow into the inner space, and
   the diffusion holes are arranged to allow the cleaning gas in the inner space to diffuse to the hollow fiber membrane bundle.

2. The hollow fiber membrane module according to claim 1, wherein the port faces the outer space.

3. The hollow fiber membrane module according to claim 1, wherein
   the partition has an outer peripheral surface facing the outer space, and
   the port is at such a position as to cause the cleaning gas having entered therethrough to come into collision with the outer peripheral surface.

4. The hollow fiber membrane module according to claim 1, wherein
   the diffusion holes have an arrangement of making an amount of cleaning gas diffused from the outer space to the hollow fiber membrane bundle smaller than an amount of cleaning gas having flowed into the outer space through the port.

5. A method for cleaning a hollow fiber membrane module by cleaning a hollow fiber membrane bundle of the hollow fiber membrane module, the hollow fiber membrane module comprising: a housing formed with a port for allowing a cleaning gas to inflow therethrough; the hollow fiber membrane bundle comprising bundled hollow fiber membranes accommodated in the housing; and a diffuser having a receiving surface extending in a horizontal direction perpendicular to a longitudinal direction of the hollow fiber membranes, and having a partition defining an inner space and an outer space surrounding the inner space under the receiving surface, and having diffusion holes that open to the inner space for diffusing a cleaning gas to the hollow fiber membrane bundle in the housing, the method comprising:
   flowing the cleaning gas into the outer space radially outward of the partition under the receiving surface of the diffuser through the port;
   overflowing at least a part of the cleaning gas across the partition from the outer space into the inner space located radially inward of the partition; and diffusing the cleaning gas in the inner space to the hollow fiber membrane bundle through the diffusion holes that open to the inner space.

6. The method for cleaning a hollow fiber membrane module according to claim 5, wherein:
the cleaning gas is introduced into the housing through the port to come into collision with an outer peripheral surface of the partition, which faces the outer space.

7. The method for cleaning a hollow fiber membrane module according to claim 5, wherein:
a larger amount of cleaning gas is flowed into the outer space than an amount of cleaning gas diffused from the outer space to the hollow fiber membrane bundle.

* * * * *